W. W. ROBACHER.
FILTERING APPARATUS.
APPLICATION FILED MAY 13, 1910.
1,051,161.
Patented Jan. 21, 1913.
2 SHEETS—SHEET 1.
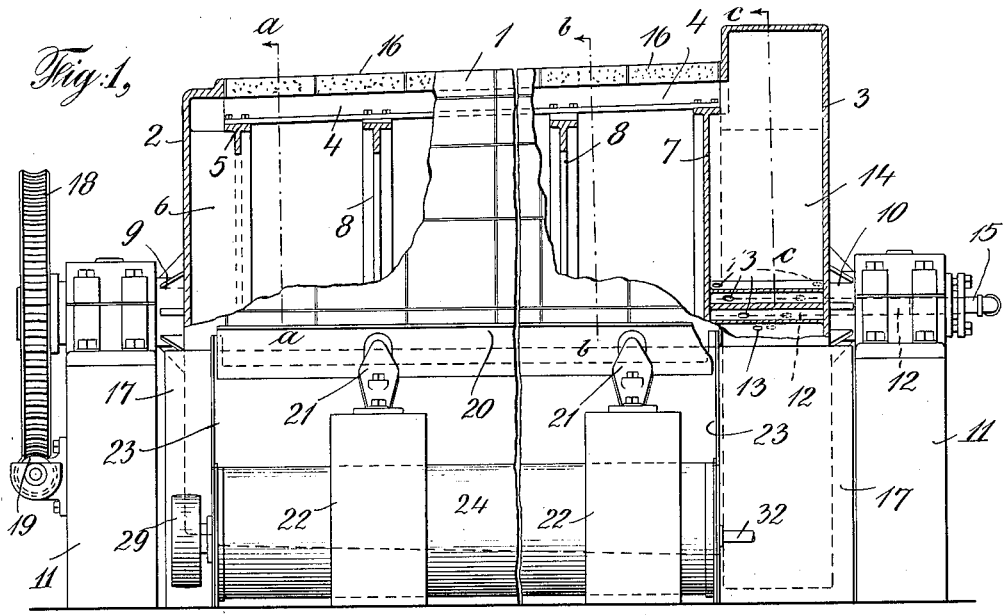
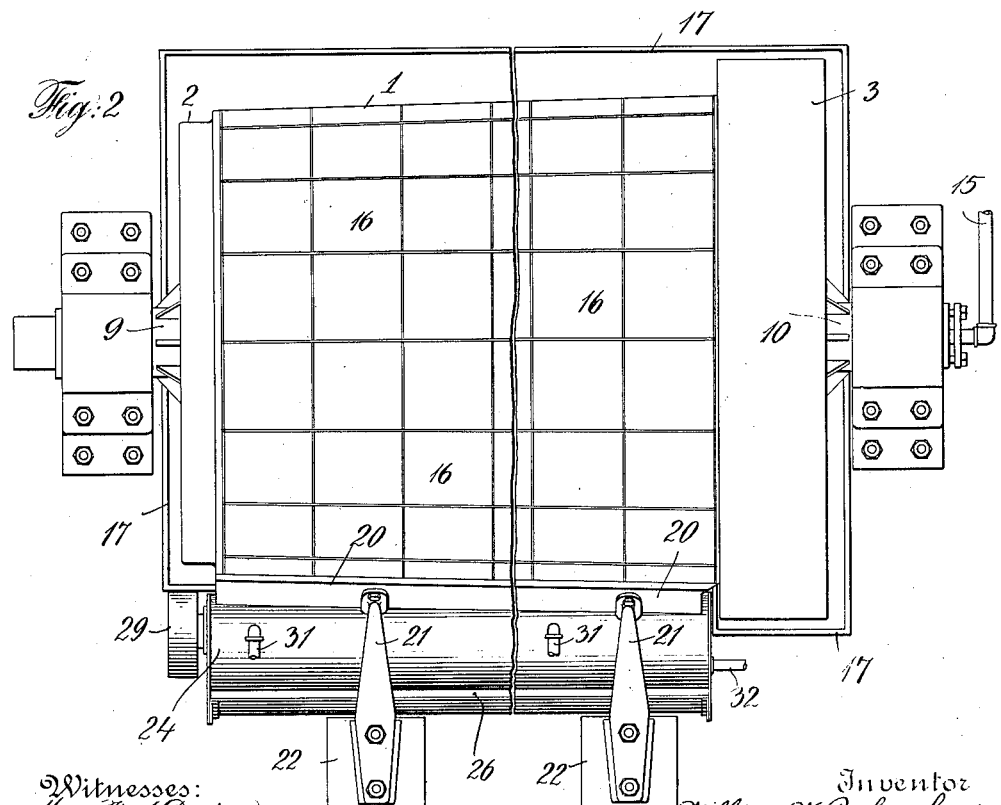
Witnesses:
Max B. A. Doring
Paul H. Frank
Inventor
William W. Robacher
By his Attorneys
Dickerson, Brown, Raegener & Matty.

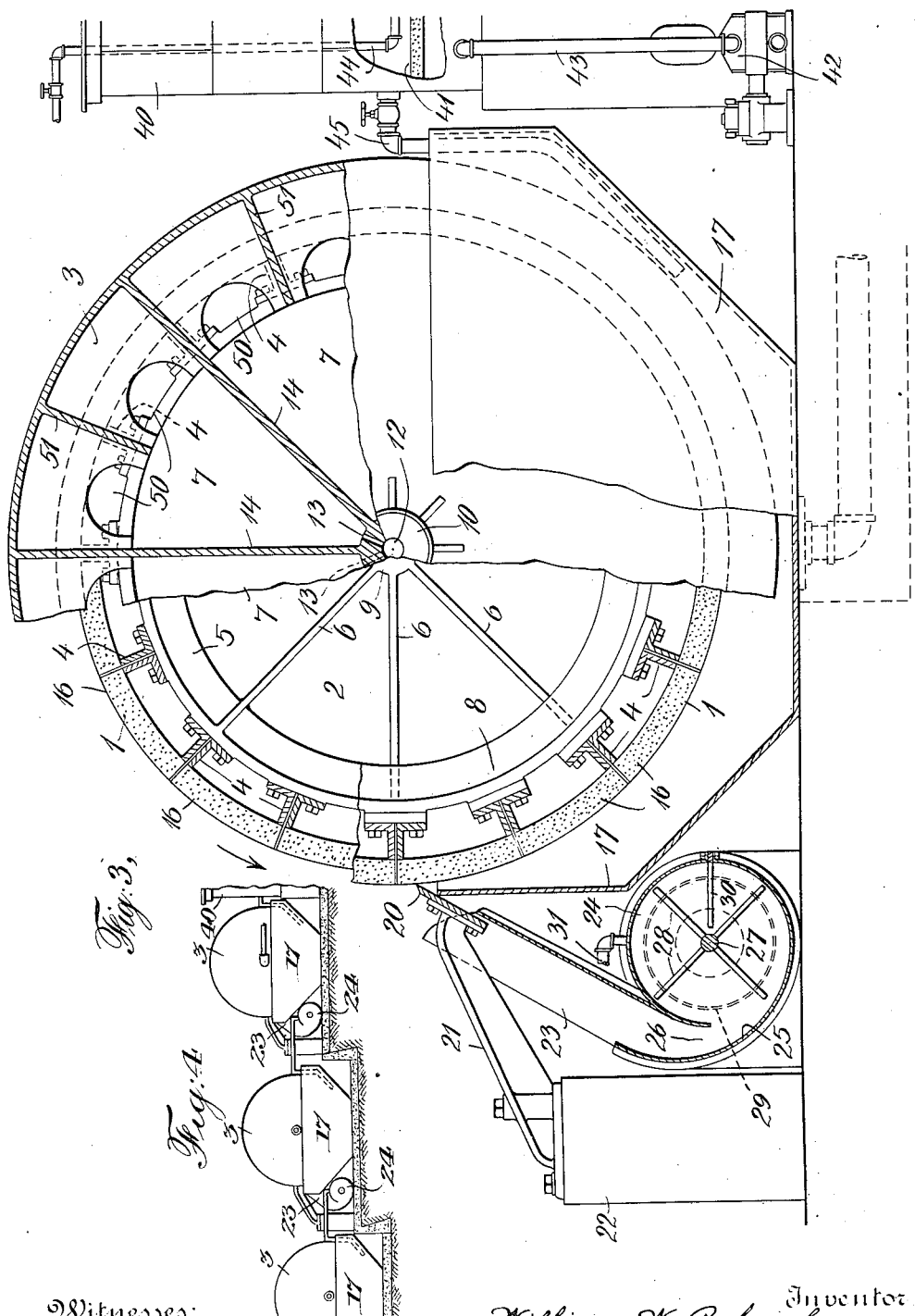

UNITED STATES PATENT OFFICE.

WILLIAM W. ROBACHER, OF ROCHESTER, NEW YORK, ASSIGNOR TO JUST PROCESS COMPANY, OF SYRACUSE, NEW YORK, A CORPORATION OF NEW YORK.

FILTERING APPARATUS.

1,051,161.          Specification of Letters Patent.      Patented Jan. 21, 1913.

Application filed May 13, 1910. Serial No. 561,044.

*To all whom it may concern:*

Be it known that I, WILLIAM W. ROBACHER, a citizen of the United States, and a resident of Rochester, county of Monroe, and State of New York, have invented certain new and useful Improvements in Filtering Apparatus, of which the following is a specification.

This invention relates to improvements in filtering apparatus, more particularly to filters for extracting precious metals from their ores, and the objects of the invention are to provide an apparatus which will carry out a continuous extracting process in a very simple and easy manner, and which will not become clogged by the slimes collecting on the surface of the filter, and which will require little or no repairing of parts.

To the accomplishment of the above objects, and to such others as may hereinafter appear, the invention comprises in combination a rotary filter, provided with a porous mineral septum for filtering wet slimes and the like, the solution being drawn through the porous mineral septum, whereas the slimes are retained upon the surface of the porous mineral septum from which they are removed, and if desired the slimes are again wet and filtered in the same manner by a similar rotary filter, provided with a porous mineral septum, connected in series with the first mentioned filter, the slimes being treated in successive steps as often as desired.

Referring to the drawings: Figure 1 is a side elevation of a rotary filter constructed in accordance with my invention, a portion of the filter wheel being broken away to show some of the parts in cross section. Fig. 2 is a plan view of the filter wheel shown in Fig. 1. Fig. 3 is an end view of the filter wheel shown in Figs. 1 and 2, the same being shown partly in section on the lines *a—a*, *b—b*, and *c—c* of Fig. 1. Fig. 4 is a view on a smaller scale showing somewhat diagrammatically several rotary filters connected in series.

In the drawings, 1 designates the filtering body, or filter wheel which in this instance has the form of a cylinder, which may be of any convenient size (in practice they have been made from three to six feet in diameter and from eight to ten feet long depending upon the conditions of use; it of course being understood that the same may be made smaller or larger as desired.)

In the present instance the filter wheel 1 comprises a head 2, at one end, and a receiving chamber 3, at the other end, the same being connected by means of the T iron braces 4. One end of each of the braces 4 is secured to a flanged ring 5 which is secured to the ends of spokes 6 secured to the head 2, whereas the other end of each of the braces 4 is secured to the flanged inner wall 7 of the receiving chamber 3, the braces 4 being also secured, intermediate their ends, to flanged rings 8.

In the present instance, the head 2 and the receiving chamber 3 are provided with trunnions 9 and 10 respectively, the same being suitably supported upon standards 11. The trunnion 10 is bored axially for nearly its entire length as shown at 12, the same being also bored transversely to provide holes 13 each of which provides a passageway from the hole 12 to the space between adjacent radial partitions 14, situated in the receiving chamber 3, so that the filtrate may be drawn from the space between adjacent partitions 14 out through the hole or passage 12, to the end of which is rotatably mounted a discharge pipe connection 15. It is also to be noted that the holes 13 are spaced along the trunnion 10, as shown in Fig. 1, so that when the filtrate passes into the passageway 12 from any one of the holes 13 it will not run directly into another hole 13 on the other side of the trunnion, but will be spattered against the sides of the passageway 12 to facilitate the withdrawal of the filtrate by means of suction applied to the pipe 15.

In the present instance, the periphery of the filter wheel as above described, is provided with a porous mineral septum 16 which for convenience and strength is advantageously made in sections, and cemented together, the same being set and held on the T iron braces 4 as shown in Fig. 3. It is obvious that the porous mineral septum 16 may be made in one piece, if so desired, but in the case of large wheels, the porous mineral septum is advantageously made in sections, as above described, to better withstand the strain to which the porous mineral septum is subject to in use.

The filter wheel as above described is rotatably mounted as before referred to, upon suitable standards 11, the lower portion of the filter wheel being immersed in a suitable tank 17, which in the present instance is very little larger than that portion of the filter wheel which is immersed in it, although the tank may be made larger if so desired.

The filter wheel is provided with means for turning the same which, in the present instance, consists of a worm wheel 18 secured to the trunnion 9, said worm wheel meshing with a driving worm 19, the filter wheel being driven in the direction of the arrow.

A suitable scraper, or cleaner, 20, in the present instance, mounted upon suitable arms 21 secured to standards 22, is provided for removing the slimes, or other material, from the surface of the porous mineral septum on the periphery of the filter wheel. Beneath the scraper 20 is provided a suitable guideway or chute 23, which extends the full length of the scraper, and which guides the slimes, or other material, as the same is removed from the periphery of the filter wheel, to the mixer 24.

The mixer 24 in the present instance comprises a sheet of metal 25 bent in the shape of a cylinder and open along one side as shown at 26, to permit the slimes, or other material, to enter the mixer, which is closed at the ends. The mixer 24 is provided with a shaft 27, provided with paddles 28, which is driven by means of a pulley 29. To prevent the slimes, or other material, from forming lumps, stationary paddles 30 are provided between the paddles 28, the same being preferably placed at the side of the mixer as shown in Fig. 3 so as not to interfere with the material entering the mixer. The mixer 24 is also provided with suitable pipes 31 by means of which water or other liquid is admitted to the mixer for mixing with the slimes, or other material, removed from the filter wheel. A suitable outlet such as the pipe 32 is provided for removing the wet slimes, or other material, from the mixer after the same has become thoroughly mixed together, the pipe 32 being secured to the mixer above the bottom of the same to accomplish this purpose.

The operation of the filter wheel as above described as applied to extracting precious metals from their ores by cyaniding is as follows: Finely ground ore mixed with a solution of cyanid is first introduced into the tank 40 provided with a porous mineral septum 41 through which air is forced, by means of the pump 42, through the medium of the pipe 43, for aerating and agitating the mass in the tank which is usually heated by means of a steam pipe 44 immersed in the tank. This method of getting the precious metals in solution being more fully described in Patents Nos. 880,821 and 887,268 granted to Porter and Clark as joint inventors. After the precious metals have been placed in solution in the tank 40 as above described, the mass is run out of the tank through the medium of the pipe 45 to the filter tank 17 which extends upward to about the center of the filter wheel 1, the tank 17 being at all times kept as full of the mass or pulp from the tank 40, as is possible without danger of overflowing. Suction is then applied to the center of the filter wheel through the medium of the vacuum pipe 15, the filter wheel being slowly rotated in the direction of the arrow as before described. While the suction is being applied to the center of the wheel, as above described, the cyanid solution containing the precious metals, is filtered through the porous mineral septum on the periphery of the filter wheel and collects in each space between the radial partitions 14 of the receiving chamber, suitable openings 50 being provided in the wall 7 to permit the filtrate to enter the receiving chamber from the bottom of the filter wheel. As each such space or pocket between the radial partitions of the receiving chamber is elevated by the rotation of the filter wheel to a horizontal position, the filtrate will flow by gravity to the center of the wheel and be taken off, with the assistance of the vacuum, through the holes or passageways 12 and 13, the holes 13 as before described, being arranged so as not to be in line with each other so as to spatter the liquid coming through the hole 13 as it rises to a horizontal position to facilitate the vacuum removing the same.

In the present instance it is to be noted that the periphery of the filtering surface of the filter wheel is made slightly conical so as to facilitate the filtrate being removed by gravity to the receiving chamber. It is also to be noted that the receiving chamber in the present instance is made a little larger in diameter than the main portion of the filter wheel so as to provide a pocket in which the filtrate may accumulate until the same is removed as before described. To further distribute the filtrate as it enters the receiving chamber, short partitions 51 are provided intermediate the radial partitions 14, which act in the same manner as the partitions 14 except that when the short partitions 51 reach a horizontal position the filtrate runs on to the adjacent radial partition 14 and out through the center of the wheel.

While the cyanid solution containing the precious metals is being removed, as above described, the slimes or material not in solution collects upon the surface of the porous mineral septum; and as different portions of the filtering surface are brought above the level of the mass or pulp in the tank 17 by the rotation of the wheel, the slimes, or solid material adhering to said portions are dried upon the surface of the porous mineral septum by the action of the vacuum drawing the liquid of such slimes into the interior of the wheel. Just before the different sections of the filter wheel are again immersed in the tank, the material adhering to the surface of the porous mineral septum is removed by means of the scraper 20, as above described, about seventy to eighty per cent. of the cyanid solution originally carried by such solid material having been removed. The proportion of cyanid solution so removed can be regulated by increasing or decreasing the diameter of the filter wheel, or by varying the speed of the same, or the degree of suction used. In practice, however, the filter wheel is run at such a speed that an extraction of about seventy or eighty per cent. is obtained. The slimes, or other material, from which seventy to eighty per cent. of the cyanid solution containing the precious metal has been removed, and which therefore contains about twenty to thirty per cent. of cyanid solution containing precious metals, after being removed by the scraper 20, passes, as before described, to the mixer 24, where the same is mixed with water or cyanid solution, through the medium of the pipes 31 so as to dilute the twenty to thirty per cent. of cyanid solution containing the precious metals, and bring the same up to about one hundred per cent. solution, so that the slimes, or other material, will be approximately of the same relative fluidity as when it entered the first filter tank 17 after leaving the tank 40. The slimes, or other material, containing twenty to thirty per cent. of the precious metals in solution, now diluted as above described, is allowed to pass from the mixer 24 by means of the pipe 32 to a second filter tank similar in all respects to the filter tank 17 shown in Fig. 3, in which is mounted a filter wheel similar in all respects to the filter wheel also shown in Fig. 3. Here the same operation is carried on whereby seventy to eighty per cent. of the solution is again removed, as in the first filter wheel, so that the slimes or other material removed from the second filter wheel, contain only from four to nine per cent. of the values originally in solution in tank 40, removed from the second wheel, although the same contains from twenty to thirty per cent. of moisture. From the second filter the slimes, or other material is again treated with water or cyanid solution in a second mixer, in the same manner as they were treated in the first mixer, and the slimes, or other material, is run into a third filter tank provided with a filter wheel in all respects similar to the other two filter wheels, just referred to, and operated in the same manner. The slimes, removed from this third filter wheel, contains the same amount of moisture as the slimes removed from the first two wheels, namely, twenty to thirty per cent., but the values in solution are usually less than one per cent. of the values originally in solution in the tank 40. The slimes removed from the third filter may be passed to a fourth filter wheel and so on, but it is not usually necessary to provide more than three filter wheels, the material removed from the last filter wheel being usually discharged into a traveling belt and conveyed away from the filter. An arrangement of a plurality of such filter wheels in series is shown on a reduced scale in Fig. 4.

While the operation of the filter wheel has been described in relation to two other similar wheels, it is of course to be understood that only one filter wheel may be used, or several used depending upon the condition of the material to be filtered and the amount of extraction required.

The porous mineral septum as above described, is preferably made uniformly porous so that the slimes which collect on the surface of the same will do so in a uniform manner and will accordingly be uniformly dried and of uniform thickness so as to be readily removed. The porous mineral septum is also made of sufficient thickness to properly filter the material, it being also important that the porous mineral septum should be thick enough to withstand the action of the vacuum and also the action of the scrapers or cleaners.

In practice a porous mineral septum of one and a half to two inches in thickness has given good results in properly filtering the material and has had sufficient strength to withstand the pressure of the vacuum and the scrapers or cleaners.

The porous mineral septum as above described is practically indestructible and can be used indefinitely without being repaired, the same is also of such a nature that it can easily be cleaned by forcing air or water under pressure from the center of the filter wheel out through the porous mineral septum without fear of injuring the same. The porous mineral septum has the great advantage of being rigid, which permits of the slimes or other material being removed by scrapers, as above described, without fear of injuring the porous mineral septum, the scrapers being set so as to remove practically all of the slimes, or other material, from the surface of the porous mineral septum, leaving the same clean to accumulate more slimes in the further operation of the filter wheel. The porous mineral septum has also the advantage of being able to filter hot material without injury to the porous mineral septum. The porous mineral septum is also not affected by strong acids or alkalis, and can filter such material with practically no deterioration of the porous mineral septum.

While the invention has been described with particular reference to the details of construction, the same is not to be considered as limited thereto, as many changes may be made and still fall within the scope of the followings claims.

What I claim is:—

1. A filtering apparatus comprising a filter wheel provided with a rigid porous filtering wall, a receiving chamber at one end of said wheel rotatable with said wheel for receiving the liquid drawn through said filtering wall, said receiving chamber being as large in diameter as the filter wheel and means for creating a difference of air pressure on opposite sides of said filtering wall.

2. A filtering apparatus comprising a filter wheel provided with a porous mineral septum on the periphery of said wheel, means for creating a difference of air pressure on opposite sides of said septum, a receiving chamber at one end of said wheel, and means in said receiving chamber for elevating the filtrate to the center of the wheel during the rotation of the wheel.

3. A filtering apparatus comprising a hollow filter wheel having a porous mineral septum on its periphery, a receiving chamber secured to said filter wheel, said receiving chamber having a central discharge connection, the interior of said receiving chamber being divided into a plurality of chambers connected to said central discharge connection whereby the filtrate flows from the interior of the filter wheel into said chambers and into said discharge connection successively, said wheel arranged to run in liquid to be filtered, means for rotating said wheel, and means for removing from the periphery of said wheel solid material accumulating thereon.

4. A filtering apparatus comprising a filter wheel, provided with a rigid peripheral filter wall frusto-conical in shape, a receiving chamber secured to the larger end of said filter wheel, said receiving chamber being larger in diameter than the greatest diameter of the filter wheel, and means for maintaining a difference in pressure on opposite sides of said filter wall.

5. A filtering apparatus comprising a filter wheel provided with a porous mineral septum on the periphery thereof, a receiving chamber of a diameter greater than said wheel at one end thereof and communicating with the interior thereof and rotatable therewith, and means in said receiving chamber comprising radial spokes for elevating the filtrate to the center of the wheel during its rotation.

In testimony whereof I have signed this specification in the presence of two subscribing witnesses.

WILLIAM W. ROBACHER.

Witnesses:
J. EDWD. PORTER,
EDWIN E. CARPENTER.